A. W. LENDEROTH.
COMBINED THROTTLE AND AUTOMATIC STOP VALVE.
APPLICATION FILED NOV. 19, 1910.
997,681.
Patented July 11, 1911.
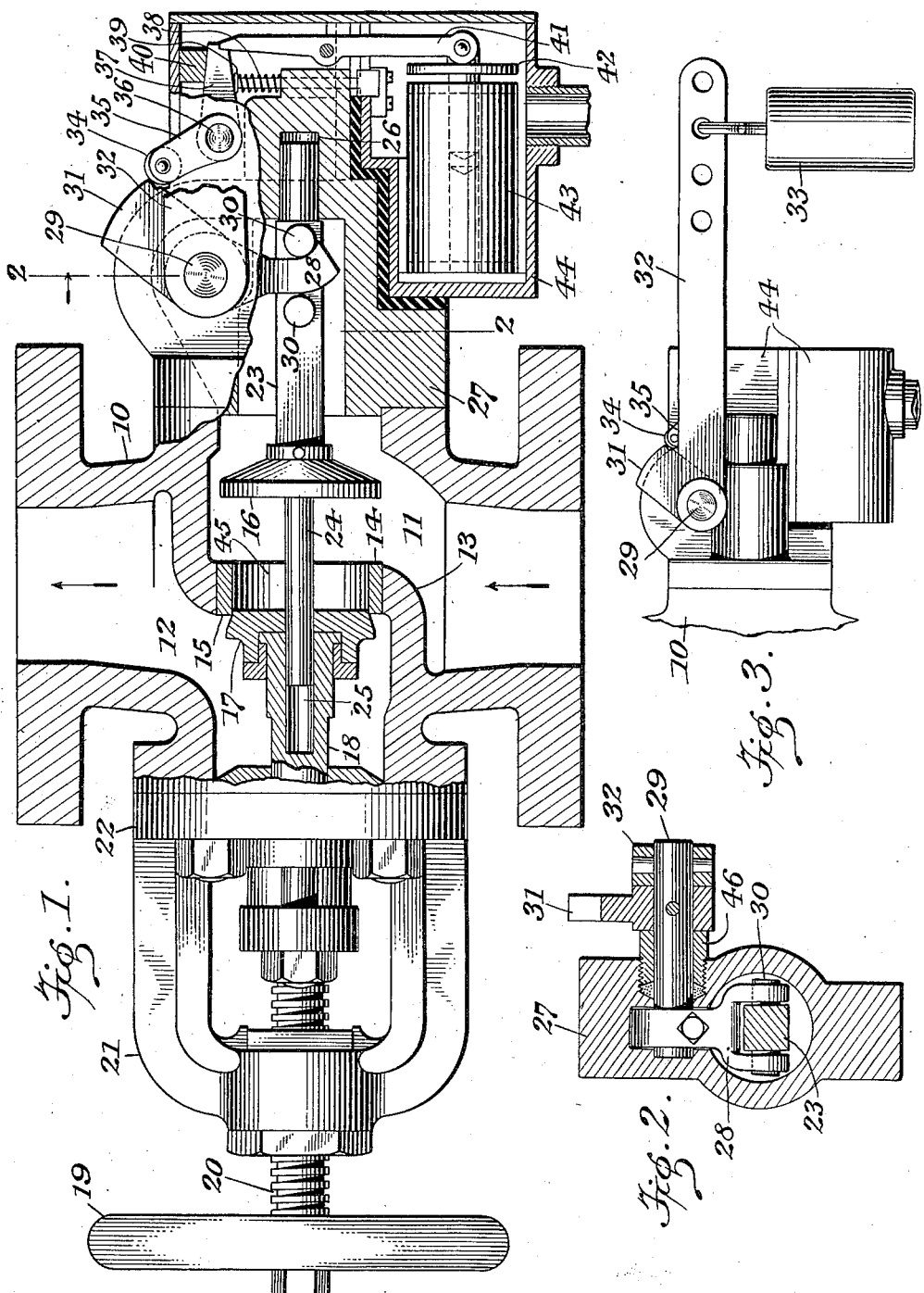

UNITED STATES PATENT OFFICE.

ARNOLD W. LENDEROTH, OF STAPLETON, NEW YORK.

COMBINED THROTTLE AND AUTOMATIC STOP-VALVE.

997,681.  Specification of Letters Patent.  Patented July 11, 1911.

Application filed November 19, 1910. Serial No. 593,137.

*To all whom it may concern:*

Be it known that I, ARNOLD W. LENDE-ROTH, a citizen of the United States, residing at Stapleton, in the county of Richmond and State of New York, have invented certain new and useful Improvements in Combined Throttle and Automatic Stop-Valves, of which the following is a specification.

This invention relates to throttle and emergency stop-valve devices principally intended for protecting steam engines against over-speeding in case of governor failure, etc., but also adapted for gas-engine, water, ammonia and other conduits. The large variety of such appliances devised and in use indicates that no one type has hitherto proven preëminently superior.

It is however the object of my invention to provide a simple form of combined throttle and automatic stop valve which shall in a larger measure than heretofore fulfil the requisites of satisfactory service, durability, low cost, and adaptability to different conditions of use.

The automatic action of this class of appliances is usually controlled from a distant point through electro-magnetic agency, and such devices divide themselves roughly into those in which the operating force is mechanical, as of a weight or spring released by a magnet to close an ordinary throttle-valve by turning its screw-stem; and those in which the operating force is furnished by fluid-pressure acting on a piston attached to the stop-valve and controlled by one or more pilot valves which in turn may be controlled by a magnet.

Mechanical stops, while hitherto somewhat complicated and slow in action, have been considered more reliable than others since their action is more nearly independent of pressure variations and they are not subject to sticking, piston leakage, wire-drawing and other defects of the pressure type. It is obviously of the utmost importance that the stop device shall be certain of operation when called upon, since the safety of property and life often depend upon its proper action in an emergency. It is further desirable in a steam-engine stop that after a shut-down of the automatic valve, it shall be difficult or impossible for the engineer to carelessly reset the latter and suddenly admit a full head of steam to the engine before it has gathered speed.

In my present invention a mechanical closing force is applied in a novel and simple manner involving even greater certainty and celerity of closure than other mechanical stops, and I insure against premature resetting of the automatic valve, by making the effective seating pressure on said valve, when so disposed as to close with the steam flow, dependent upon the position of the main throttle-valve. My invention may however be used with a normal flow in the reverse direction under some conditions, as in an ammonia line where the pressures are comparatively low, in which situation the automatic valve after its closure acts as a safety release for accumulated pressure.

Of the accompanying drawings which illustrate a preferred embodiment of my invention, Figure 1 represents a longitudinal section of the apparatus. Fig. 2 represents a cross section on the line 2—2 of Fig. 1. Fig. 3 represents a side elevation on a reduced scale, showing the weight and parts of the trip mechanism.

In the drawings, 10 indicates a valve casing formed with inlet and outlet chambers 11, 12 connected by a port or passage 45 in a dividing partition 13, said port having valve seats 14, 15 at its opposite ends.

16 is an automatic stop-valve coöperating with the valve seat 14, and 17 is a main throttle valve coöperating with the seat 15 and swiveled upon a valve stem 18 so as to be positively moved with the latter in either direction. 19 is a hand-wheel on the outer end of said stem and 20 is the usual screw thread on said stem working in a complemental thread in a yoke 21 on the removable casing head 22 through which the valve stem passes.

23 is the stem of the automatic valve having an extension 24 on its inner end sliding in a guiding aperture 25 in the valve stem 18. The outer end of stem 23 slides in a guiding aperture 26 of the removable casing head 27 which carries the controlling devices for the automatic valve. Said casing head is recessed as shown to form an extension of the inlet chamber 11, the construction here provided being especially adapted for the case in which inlet and outlet branches are in line with each other.

The square body of valve-stem 23 is straddled by a forked arm 28 mounted on a rock-shaft 29 and inserted between the projecting ends of a pair of studs 30 on said stem, whereby the stem 23 and valve 16 are positively moved in either direction when shaft 29 is oscillated. The arm 28 stands vertical when valve 16 is fully opened and it will be noted that its lower end is hooked outwardly so as to preserve an even width of said arm between the studs in all positions of the valve, this shape also facilitating the assembly of the valve-stem 23 with the fork 28 by a longitudinal movement of said stem accompanied by partial rotation of the shaft 29.

Rock-shaft 29 passes through a stuffing box 46 on the head 27 and carries on its outer end a trip or catch arm 31, and a weight arm 32 carrying a weight 33 (for which a spring would be equivalent) which acts in a direction to close the valve 16. Normally however said valve is held open by the engagement of arm 31 with a catch roller 34 on an arm 35 which is attached to a rock-shaft 36, the latter also carrying a latch arm 37 adapted to be engaged by the upper end of a pivoted latch-lever 41 whose lower end is attached to the armature 42 of an electromagnet 43, the latter and the latch members being inclosed in a casing 44. A spring 38 and rod 39 normally hold the latch-arm 37 against an abutment 40, and when in this position the corner of trip arm 31 engages the roller 34 on a line of thrust such that when the magnet 43 attracts its armature to release the arm 37 from latch-lever 41, the arms 35 and 37 will be displaced against the spring 38 and weight 33 will close the valve 16. Any other suitable form of trip mechanism may be used and it will be understood that magnet 43 is under control from a distant point by means of push buttons or engine-speed devices in the usual manner.

This apparatus will ordinarily be placed in a steam line with the flow in the direction of the arrows in Fig. 1, so that valve 16 when released tends to close with the flow. Valve 17 is manually operated by means of its hand-wheel 19 after the manner of an ordinary throttle, and is adapted to perform all of the functions of the latter as well as the additional function which I shall now describe. Supposing both valves to be open, if now the magnet 23 be energized it will actuate the trip mechanism to release the arm 31 and allow weight 33 to close valve 16 as described. The final closure of the valve will be somewhat accelerated by the pressure of the steam behind it, and in the larger sizes of these valves a dashpot may be provided to cushion the closing action, as will be readily understood without illustration. When the valve 16 is once closed the pressure in the inlet chamber 11 will make it difficult or impossible to reopen the valve manually so long as the main throttle-valve 17 remains open. Hence the automatic valve cannot be carelessly reset with the effect of suddenly admitting a full head of steam to the engine. But when valve 17 has been closed, the slight leakage which occurs between valve 16 and its seat 14 soon causes a sufficient pressure to accumulate in the passage or chamber 45 between the two valves to balance the valve 16, and thereupon the latter may be easily opened and reset under the control of the trip mechanism by manipulating the weight lever 32. Steam can then be gradually admitted to the engine without damage when the latter is in condition to receive it, by slowly opening the valve 17. The balancing of valve 16 in the manner described may be accelerated by providing more than the normal leakage in any suitable manner, as by merely machining but not grinding the meeting surfaces of the valve and its seat.

For use with water or other liquids, and in gas-engine supply-pipes and various other situations, this valve will operate satisfactorily and is obviously independent of fluid pressure forces for effecting automatic closure. In ammonia gas or other compressor-delivery lines where the pressure is comparatively low, I prefer to close the valve 16 against the pressure, a sufficient weight being applied to the arm 32 for that purpose, as under such circumstances the valve 16 may act as an automatic loaded relief-valve to prevent the accumulation of an excessive pressure due to the continued operation or momentum of the compressor after the automatic valve has closed. Under such circumstances and in fact for use as a throttle in most situations; it is obviously desirable that the valve 17 shall be positively movable by its screw-stem in both directions.

It will be noted that there is only one packed bearing in the connections of the automatic valve, namely that of the rock-shaft 29, and as this is a rotary, as distinguished from a sliding, shaft or stem, and subject to forces which act on it with considerable leverage, there is no danger of failure of the automatic valve through too tight an adjustment of the packing.

I am aware that it is not broadly new to provide independent signal-disk valves closing in opposite directions at the two ends of a partition port, such an arrangement having been proposed in automatic cut-out or "non-return" devices where the respective valves are closed in either direction by a rush of steam or diminution of pressure caused by fracture of the pipe. But such valves have to be normally biased to open by weight or pressure, are delicate in action, and subject in greater or less degree according to their design, to the defects common to pressure-operated valves.

I claim,—

1. A combined throttle and emergency stop-valve device comprising a casing having inlet and outlet chambers and a connecting port or passage, an automatic valve in one of said chambers mechanically biased to close one end of said port, catch mechanism for holding said valve in an open position, an independently-movable throttle valve in the other chamber controlling the opposite end of said port, and means for manually operating said throttle-valve.

2. Throttle and emergency valve apparatus comprising a casing having inlet and outlet chambers connected by a port or passage, an unbalanced disk valve in said inlet chamber, a weight yieldingly impelling said valve to close one end of said port, catch-mechanism for holding said valve in an open position, a screw stem provided with an external manual operating device, and a throttle valve mounted on said stem in the outlet chamber and adapted to be positively moved by the stem independently of the first-said valve to open and close the opposite end of said port.

3. Throttle and emergency valve apparatus comprising a casing having inlet and outlet chambers connected by a port or passage, a disk valve controlling one end of said port and having a stem slidingly supported in said inlet chamber, a rock-shaft journaled in the wall of said chamber and internally connected to operate said valve in both directions, an external weight carried by said rock-shaft and tending to close said valve, external catch mechanism coacting with said shaft to hold the valve open, and an independently-movable throttle-valve controlling the opposite end of said port and having external manual operating means at the opposite side of the casing from said rock-shaft.

4. Throttle and emergency stop-valve apparatus comprising a casing having inlet and outlet chambers connected by a port, a separate head on the inlet side recessed to provide an extension of the inlet chamber and also formed with a valve-stem guide, a separate head on the outlet side, a screw stem engaged with the latter head, a throttle-valve on said stem controlling one end of said port, an automatic valve in the inlet chamber controlling the opposite end of said port and having a stem the outer end of which is mounted in said guide and the inner end guided on said throttle-valve stem, a rock-shaft having an arm adapted to be assembled with the automatic valve-stem by an outward longitudinal movement of the latter accompanied by a rotary movement of said shaft, a weight connected with said shaft and biasing the automatic valve toward a closed position, and catch-mechanism coacting with said shaft for holding the automatic valve open.

5. Throttle and emergency valve apparatus comprising a casing having inlet and outlet chambers connected by a port, a throttle valve controlling the outlet end of said port and having external operating means, an automatic stop valve controlling the inlet end of said port and having a squared stem provided with two studs projecting on each side thereof, a rock-shaft on said casing having an arm with a forked end mounted between said studs and hooked outwardly, an external weight on said shaft yieldingly impelling said automatic valve to a closed position, and catch mechanism controlling said shaft for holding the automatic valve open.

In testimony whereof I have hereunto set my hand in the presence of two subscribing witnesses, this 18th day of November 1910.

ARNOLD W. LENDEROTH.

Witnesses:
R. M. PIERSON,
EDWARD E. BLACK.